(12) United States Patent
Hosseinisianaki et al.

(10) Patent No.: US 11,477,151 B2
(45) Date of Patent: Oct. 18, 2022

(54) PURPOSE DETECTION IN COMMUNICATIONS USING MACHINE LEARNING

(71) Applicant: Microsoft Technology Licensing, LLC, Redmond, WA (US)

(72) Inventors: Saghar Hosseinisianaki, Redmond, WA (US); Wei Wang, Redmond, WA (US); Ahmed Awadallah, Redmond, WA (US); Paul N. Bennett, Redmond, WA (US); Christopher B. Quirk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/095,383

(22) Filed: Nov. 11, 2020

(65) Prior Publication Data

US 2021/0136018 A1 May 6, 2021

Related U.S. Application Data

(63) Continuation of application No. 16/397,127, filed on Apr. 29, 2019, now Pat. No. 10,868,785.

(51) Int. Cl.
*H04L 51/18* (2022.01)
*G06N 20/00* (2019.01)
*G06F 40/30* (2020.01)
*G06N 3/08* (2006.01)

(52) U.S. Cl.
CPC .............. *H04L 51/18* (2013.01); *G06F 40/30* (2020.01); *G06N 3/08* (2013.01); *G06N 20/00* (2019.01)

(58) Field of Classification Search
CPC .......... H04L 51/18; G06N 20/00; G06N 3/08; G06F 40/30
USPC ........................................................ 709/219
See application file for complete search history.

(56) References Cited

U.S. PATENT DOCUMENTS

| | | | |
|---|---|---|---|
| 2005/0192992 A1* | 9/2005 | Reed .................... | G06Q 10/107 |
| 2017/0346769 A1 | 11/2017 | Mccray et al. | |
| 2020/0097303 A1* | 3/2020 | O'Kane ............... | G06Q 10/109 |
| 2020/0110750 A1* | 4/2020 | Joseph .............. | G06F 16/24575 |

OTHER PUBLICATIONS

"International Search Report and Written Opinion issued in PCT Application No. PCT/US20/023467", dated Jun. 22, 2020, 9 Pages.

* cited by examiner

*Primary Examiner* — Glenford J Madamba
(74) *Attorney, Agent, or Firm* — Schwegman Lundberg & Woessner, P.A.

(57) ABSTRACT

Generally discussed herein are devices, systems, and methods for identifying a purpose of a communication. A method can include receiving a communication including communication content and communication context, the communication content a first portion of the communication and the communication context a second, different portion of the communication. The method can include identifying, by a machine learning (ML) model, based on the communication content and the communication context, one or more purposes associated with the communication, the one or more purposes indicating respective actions to be performed by a user that generated or received the communication. The method can include providing data indicating the purpose of the first portion of the content.

19 Claims, 7 Drawing Sheets

```
102 —  FROM: NAME(S)
104 —  TO:   NAME(S)/ADDRESS(ES)
106 — SUBJECT: SUMMARY OF EMAIL CONTENTS
108 — TIME   DATE    TIME
110 — ATTACHED   ITEM
```

112 — Hi Alice,
Thanks for the great tutorial about the new development tools. It was great catching up with you. We should get together sometime to continue our discussion soon.
I am writing to check if you still have the document you mentioned about how to submit jobs to the new cluster? If so, could you please share it with me? I need to run some tests for the new feature.            114
Thank you!

Best,
Jack

*FIG. 1*

PURPOSE DETECTION IN COMMUNICATIONS USING MACHINE LEARNING

CROSS-REFERENCE TO RELATED APPLICATION

This application is a continuation application of, and claims the benefit of priority to, U.S. patent application Ser. No. 16/397,127, titled "PURPOSE DETECTION IN COMMUNICATIONS USING MACHINE LEARNING" and filed Apr. 29, 2019, the disclosure of which is hereby incorporated by reference in its entirety.

BACKGROUND

The use of email has grown over the past several decades both in terms of total volume (information overload) and in terms of the number of purposes for which email is used (functional overload). Many email programs serve as a communication tool and also as a repository of tasks, a personal archive, and a calendaring tool. While a variety of research has focused on how to support this functional overload by directly integrating task support or calendaring within email clients, little research has focused on how the information present in other data sources can be leveraged to mitigate the information overload. Email continues to be one of the most important means of online communication. People spend a significant amount of time sending, reading, searching and responding to email, such as to manage tasks, exchange information, or the like.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A system can include a memory to store parameters defining a machine learning (ML) model, the ML model to identify whether one or more purposes are associated with a communication, the one or more purposes indicating respective actions to be performed by a user that generated or received the communication. The system can include processing circuitry to provide, as input to the ML model, data indicating communication content and communication context, the communication content including a first portion of content from the communication to be classified, and the communication context including (a) content from an associated, different communication or (b) content from a second, different portion of the communication to be classified. The processing circuitry can further receive, as output of the ML model, data indicating the purpose of the first portion of the content.

The communication can be an electronic mail (email). The first portion can be a sentence from the email. The context can be content, other than the sentence, from the same email or a different email. The ML model can include a dynamic-context recurrent neural network (RNN) that implements a content encoder to encode the first portion into encoded content, a context encoder to encode the context into encoded context, a feature fusion operation to combine the encoded content and encoded context into a fused representation, and a classification operation that determines the purpose of the content based on the fused representation. The content encoder can encode sentences of the context and performs a purpose-based attention operation on the encoded sentences to generate weighted and encoded sentences.

The feature fusion operation can receive the weighted, encoded sentences and generates an attention matrix that includes values indicating, for respective portions of the content, which portions of the context are relevant. The ML model further performs another attention operation that operates based on the generated attention matrix to generate a context-aware representation of the content, and wherein the classification operation operates on the context-aware representation.

The purpose of the communication can include one or more purposes and one or more corresponding sub-purposes. The purpose of the communication can relate to information exchange, task management, scheduling and planning, and social communication, and wherein a sub-purpose for information exchange relates to sharing information or requesting information, a sub-purpose for task management includes requesting an action or promising an action, a sub-purpose for scheduling and planning include scheduling a meeting or reminding of a meeting, and a sub-purpose for social communication includes a greeting or thank you. The processing circuitry can further provide data indicating the purpose to a personal information manager (PIM) application that cause the PIM to automatically generate a reminder or a meeting invite.

Embodiments further includes methods of performing operations of the system and computer-readable media configured to perform the operations of the system.

BRIEF DESCRIPTION OF DRAWINGS

FIG. 1 illustrates, by way of example, a diagram of an embodiment of a request in an email presented on a user interface.

DETAILED DESCRIPTION

Figure 2:
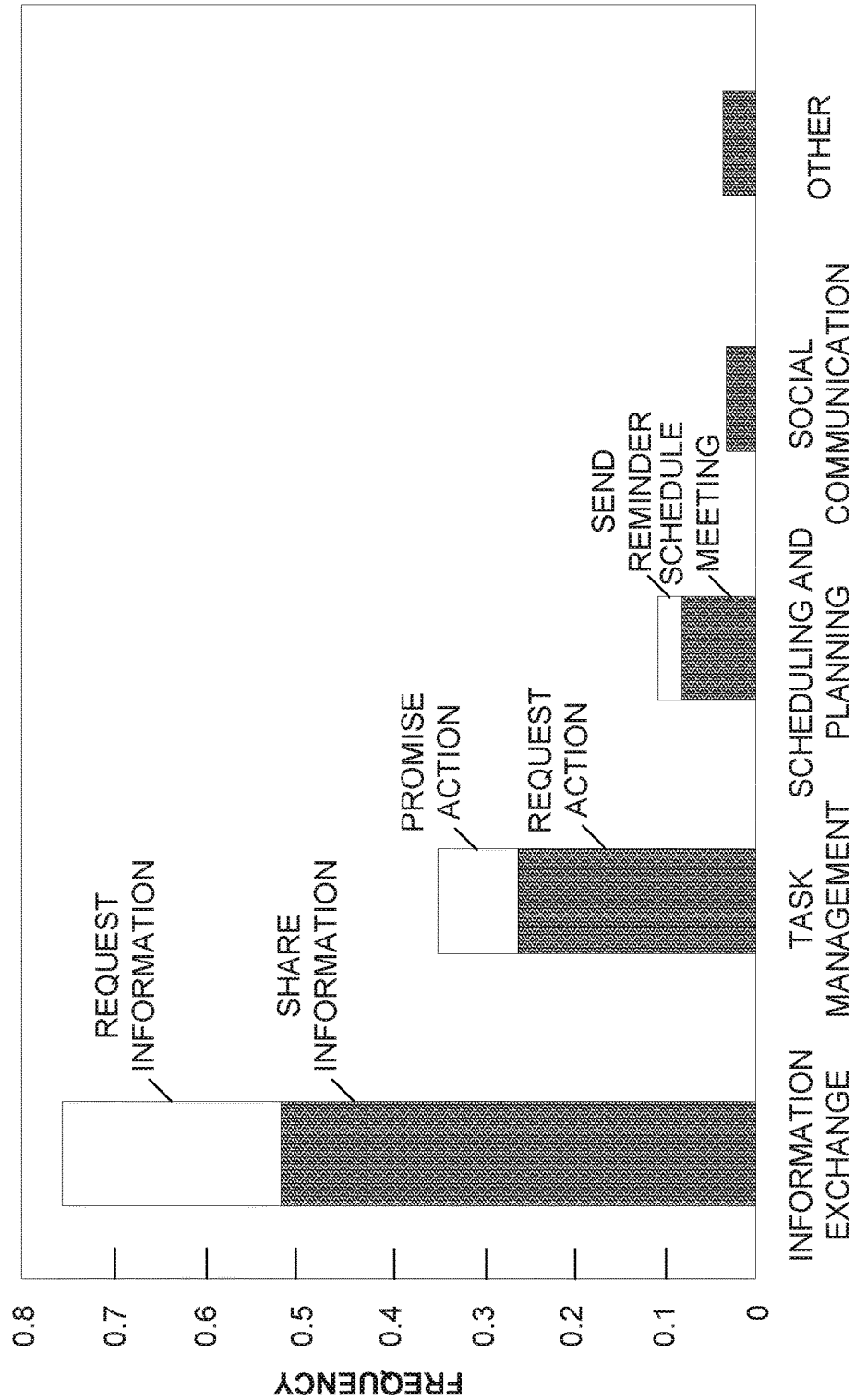
FIG. 2 illustrates, by way of example, a bar graph of results of a manual annotation of the Avocado email set.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage medium, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Email has been an important internet-based communication medium for more than 25 years. While email was first designed for asynchronous communication, people have "overloaded" the use of email with other functions such as task management and personal archiving. As online services and the uses of the web grow, email not only continues to serve these purposes but an ever-increasing number (e.g., as a receipt file cabinet for e-commerce purchases, as a standard part of identity/authentication flow, and as calendar management).

Regarding calendar management, because meeting arrangement and time negotiation often happen through email, nearly every modern email service—both web email and client applications—offer fully featured calendar management. Despite this integration, the majority of feature development has focused on moving information from email into a user's calendar, but little work has focused on the implications of calendar information for improving other functionality of a personal information management (PIM) service.

People use email not only as a communication tool, but also to create and manage tasks, and manage a calendar. When the number of ongoing tasks created via emails increases, people can struggle to manage their tasks and monitor their progress. Automatic task management systems (e.g., PIMs) can overcome this problem and help people manage their tasks more efficiently. Commitments, such as "I'll send the report by end of day" are one type of task that involve promises made between individuals to complete future actions. Another type of task is a request. A request includes asking another person to perform an action. The tasks detected herein are part of a communication between a user of a first device and a user of a second device. The task can be part of a text, email, instant messaging communication, file, attachment, or the like.

Embodiments regard identifying intents in email but are not limited to just email. Embodiments can be employed to identify an intent in any communication. A communication can include the previously mentioned email, a phone call (e.g., a transcript of a phone call), a simple messaging service (SMS) message (sometimes called a text message), a web or network based messaging service, such as Teams or Skype® from Microsoft® Corporation of Redmond, Wash. United States, Messenger from Facebook®, Inc. of Menlo Park, Calif., United States (or other social network messaging service), or the like. A communication can also include a comment on a post in a web forum, such as a blog, news article, post on a social networking site, or the like. Other types of communications are also encompassed by embodiments. However, this disclosure focuses on a particular type of communication, email messages, even though embodiments are applicable to many other types of communications.

In general, a communication dataset can be analyzed to characterize a purpose (sometimes called an intent or task) in the communications. The characterizations can form a basis for training a model in a supervised fashion. This characterization can be used to aid understanding of purpose identification in communication. The characterization can be provided to a PIM or other application that supports taking actions triggered by a communication. The PIM can (e.g., automatically) (a) formulate a response, such as a communication, that includes requested information; (b) generate a calendar event, such as a meeting invite, an appointment, or the like; (c) generate a reminder to respond or perform an action, or the like.

Previous work on email intent understanding has focused on classifying email messages into broad topical categories or detecting sentences that contain action items or follow certain speech acts. Unlike standard topic-based text classification, understanding intent can be improved using a deeper understanding of the text and detecting sentences that demonstrate the intent. Previous work has focused on sentence-level classification using n-gram features with logistic regression or support vector machines (SVM). Embodiments improve upon prior techniques by leveraging context from a communication. The context can help improve the detection of intents in the communications. Embodiments leverage one or more of the sentence-level information and the communication-level context. Embodiments can help improve upon prior techniques, such as by identifying more intent actions to be performed, more accurately characterizing intents, or the like.

Previous work has identified four distinct uses of email: task management, social communication, scheduling, and information exchange. Previous work also studied how to detect emails that include a request for action and showed that such emails are less likely to be deleted by the user, and more likely to be left in the inbox or filed.

Studying and detecting intent in communications can enable a better understanding of how email is used and how machine intelligence can be integrated into email or other communication systems. Understanding fine-grained intents like intent to set up a meeting or promise to accomplish a task can enable creation of new intelligent experiences where an agent can step in and assist the user by scheduling the meeting on her behalf or tracking the task in her to-do list.

Embodiments improve upon prior work by studying intents in communications. Embodiments expand on the different uses of communications, providing a more fine-grained intent than the four intents previously discussed. Instead of using survey-based methods, embodiments may be based on a large-scale analysis of a publicly available dataset of enterprise communications, thus providing more training data and more accurate model training.

Embodiments can extract a request for action or an action-item in two or more ways (sometimes called a purpose). The first includes detecting intent at a finer grain (e.g., request for setting up a meeting, sharing a document, or the like as compared to the four intents discussed previously). The second includes leveraging context to improve intent detection. Previous work focused on identifying the sentences in the email that contain requests for action items. This is preferred over a traditional document classification approach that classifies a single intent with an entire email. However, focusing on just a sentence-level detection ignores a rich set of contextual information available in the rest of the communication.

FIG. 1 illustrates, by way of example, a diagram of an embodiment of a request 114 in an email 100 presented on a user interface. The email 100 can be part of a domain of data (sometimes called a corpus), in an XML, HTML, or other format, with metadata describing the content of the email 100. The email 100 as illustrated includes a from: line 102, a to: line 104, a subject 106, a time 108, attachment(s) 110, and a body 112. The from: line 102 indicates an account from which the email 100 originated. The to: line 104 indicates an account to which the email 100 was sent. In many emails, the to: line includes a copy contact (cc:) and a separate blind copy contact (bcc:) line. The subject 106 generally summarizes a content to be covered in the email 100. The time 108 is generally time zone dependent and indicates a date and time of the email 100. The attachment(s) 110 are resources that the sender indicated in the from: line 102 deem to be relevant to the email 100. The body 112 includes text, images, or other data describing, in greater detail, the reason for the email 100. Any of the information of the email 100 can be used to help identify a task in the email 100. For example, the body 112 in the email 100 includes the request 114 "If so, could you please share it with me?". Note that an intent, as used herein, includes a task (an action imposed on oneself) or a request (an action imposed on someone by another).

Such intents are often expressed in email or other communications, such as direct messages, calendar events, or the like, and users can struggle to recall and complete them in a timely manner. Detecting intents (e.g., automatically, such as without human interference after deployment or installation) and providing a reminder of the intent, enables task management tools, such as a personal information managers (PIMs), or digital assistants to generate reminders or notifications to help users meet their obligations. Despite the potential benefits of automatic task detection, work in this important area has been limited to only a handful of studies.

Intents involve promised action or requested action. Detecting intents made in communications (e.g., "I'll send the report by end of day", "please remind me a few hours before the meeting", "can you send it to me?", "set up a meeting and invite John", "just checking in", among many others) enables PIMs to help users recall promises they have made and help users complete them in a timely manner. Embodiments herein can reliably detect intents in communications, such as instant messages, text messages, files, attachments, transcripts of phone calls or meetings, team collaboration tools, or other communications. The embodiments can use one or more machine learning models that are trained to classify the intent.

In FIG. 1 the request 114 represents a sentence where the sender is requesting information from the recipient. To recognize the intent behind this sentence, it can help to consider the context provided in the rest of the communication. Consider that the request 114 is not specific enough to identify what is being requested. Without context (other data of the same communication or a different, related communication), it would be difficult, if not impossible, to determine the "it" that is referenced in the request 114. Thus, context from the communication, or a related communication, can help improve the detection of intents in communications. Embodiments can include models that can leverage the context to improve the model performance.

Embodiments can provide improvements upon prior intent classifiers by: (a) incorporating context information for identifying intents in communications, (b) providing several ways to represent content and the context, and show that leveraging the whole communication (or string of communications) as context can improve the performance, and (c) an improved context-aware attention to integrate the context information into sentence representation, which can further improve the classification accuracy.

Efficient email management strategies help increase productivity. Embodiments can efficiently identify intents in communications. Embodiments can improve workers productivity using new intelligent experiences to assist users with their tasks seamlessly and efficiently.

Communication intents of communications in a communication corpus can be studied to identify the effect of using context on detecting those intents. Some categories of email intents that have been studied in previous work can be studied to determine how they manifest in communications in the corpus. This can be performed by analyzing a sample of a large-scale enterprise communications dataset. An analysis can be performed to help understand whether humans use context in understanding intent in email. To understand the meaning of text, humans not only read the given text but also pay attention to relevant information in the surrounding text. Thus, before studying how to build a model to leverage context, this disclosure focuses on quantifying an impact of context on a human ability to identify intent in a communication.

An objective of this analysis can be to characterize the different types of intents that occur in communications, how often they occur and how often they co-occur in a single message. Four distinct categories for communication intents can include information exchange, task management, scheduling and planning, and social communication. Each of these categories can be associated with one or more sub-intents. Definitions for each intent and sub-intents can be as follows:

Information Exchange: an information exchange intent involves communicating about information; either the sender intends to share information or to seek information. A common use of email includes asking questions, requesting or sharing content, status updates, or the like. Two sub-intents of this category can include: share information and request information. Sharing information means the sender would like to share information or content with the recipient(s), such as another communication, a progress update, status update, a document, or the like. Requesting information denotes a scenario in which the sender is requesting information that can be potentially responded to by sharing a document or a similar resource. Note that these sub-intents are not comprehensive. For example, there are other sub-intents like asking questions, requesting confirmation, or the like.

Task Management: Email is often used to manage tasks and the actions associated with those tasks. The definition of task management is very general and thus can be divided into at least two distinct sub-intents: request action and promise action. Requesting an action means that the sender is asking the recipient to perform some activities. Promising an action means the sender is committing to perform an action.

Scheduling and Planning: Scheduling and planning involves people or agents intending to schedule an event or share a reminder about a coming event. This category of intents includes schedule meeting and reminder. Scheduling meeting refers to the sender's intention to organize an event, such as a physical meeting, a phone call or a conference call. Reminder refers to the sender's intention to remind the recipient about an upcoming event.

Social Communication: Social communication are casual messages such as greeting messages, acknowledgements, or thank you notes, which are exchanged between people. Examples of sub-intents for the social communication category include, but are not limited to, greeting messages and thank you notes.

To better understand the characteristics of user intent in communications, the intents of communications in the Avocado research email collection, from the Linguistic Data Consortium, were manually identified. This collection contains corporate emails from a defunct information technology company referred to as "Avocado". The collection contains an anonymized version of the full content of emails, and various meta information from Outlook® mailboxes for 279 company employees. The full collection contains 938, 035 emails. For this analysis, 1,300 email threads were selected at random from the Avocado dataset. The first email message was annotated by three annotators according to the intents and sub-intents discussed earlier.

For each message, the annotator could choose multiple intents and the final judgment was made by a majority-voting strategy. The final intent(s) for the email are those which are selected by at least two annotators. A Kappa score of 0.694 was achieved for the inter-annotator agreement.

FIG. 2 illustrates, by way of example, a bar graph 200 of results of a manual annotation of the Avocado email set. In the graph 200, an overall frequency of the detected intent and sub-intent is provided on the y-axis. In the graph 200, the intent is provided on the x-axis. The intents are provided in descending order with the most popular detected intent on the left and an "other" intent on the right. The most often detected intent in the analyzed subset of the Avocado corpus was information exchange. The sub-intent of "share information" was the most popular of all the sub-intents at just over half of the analyzed email threads. The next most popular intent was task management, followed by scheduling and planning, followed by other, and followed by social communication.

Note that the list of sub-intents is not comprehensive. Hence, an annotator can select "other" when they are unable to identify the intent (e.g., a forwarded message with no text) or when the email had an intent that is not defined by one of the four intents or sub-intents. That information exchange and task management are the most frequent intents in enterprise emails is similar to findings in previous work that used surveys to characterize different usage of email. Note that the percentage of the information exchange intent is significantly higher in this analysis, while the scheduling intents are considerably lower compared to previous survey results. The discrepancy can be explained by the differences in the method of data collection, data source, and the amount of annotated data. Note that the analysis is based on annotation of a public email data set where email messages were selected at random. For the survey, the data was collected for 581 emails which asked respondents to provide intent information about five new non-spam messages in their email inbox. It is possible that, when asked to recall an email, a respondent can think about an email that does not match the distribution of all emails in their mailboxes. Additionally, different work environments (a university in the case of the survey and an IT company in our case) could affect the distribution of intents in email messages.

Single vs. Multiple Intents: communications can include more than one intent and the intents are not mutually exclusive. For example, an email message could be sending a reminder about a deadline and requesting an action to be completed before the deadline. In the manual annotation analysis, about 55.2% of messages contain a single intent, 35.8% contain two intents and 9.0% contain three or more intents. Looking in more details at the emails with multiple sub-intents, it was observed that some intents (sub-intents) are highly correlated. Table 1 details the correlation of sub-intents in email chains in the subset of the Avocado corpus analyzed.

TABLE 1

Correlation between intents and sub-intents in communications with multiple intents

|  | Promise Action | Reminder | Request Action | Request Info | Sched. Meeting | Share Info. | Social |
| --- | --- | --- | --- | --- | --- | --- | --- |
| Promise Action | 1.00 | 0.04 | 0.38 | 0.21 | 0 | 0.56 | −0.28 |
| Reminder | 0.04 | 1.00 | 0.26 | 0.08 | −0.02 | 0.38 | −0.36 |
| Request Action | 0.38 | 0.26 | 1.00 | 0.35 | 0.13 | 0.67 | −0.23 |
| Request Info | 0.21 | 0.08 | 0.35 | 1.00 | 0.25 | 0.67 | 0.01 |
| Sched. Meeting | 0 | −0.02 | 0.13 | 0.25 | 1.00 | 0.39 | −0.31 |
| Share Info. | 0.56 | 0.38 | 0.67 | 0.67 | 0.39 | 1.00 | −0.04 |
| Social | −0.28 | −0.36 | −0.23 | 0.01 | −0.31 | −0.04 | 1.00 |

Table 1 shows the co-occurrence of different sub-intents in the same communication which is based on the frequency of emails with specific pairs of sub-intents. In addition, based on Table 3, discussed below, intents to share information and request information are very likely to happen in the same email, while social and reminder or schedule meeting sub-intents are unlikely to co-exist in the same email. An example of text which contains share information and request information sub-intents is "We have been invited to the X conference in Seattle. Please let me know if the team has enough budget to pay for our travel".

An analysis is provided to determine whether context helps with identifying intent manually. This analysis includes comparing performance of humans in identifying intent when they have access to, or lack access to, context. The study and the results are now described.

There is an effect of leveraging contextual information in human detection of a sub-intent. One intent is used as an example, the request information intent, and the effect of contextual information on human performance in identifying whether a sentence contains the intent is analyzed. The entire email body can be used as context. Then it is determined whether the entire email body helps the human understand the intent of a target sentence in the body. 540 instances were picked from the ground truth set such that half of them have positive labels. All instances were sent to two groups of human annotators. One of them had access to the full email body, with the target sentence highlighted, and the other only had access to the target sentence. The majority annotation for each sentence represents its human prediction. The annotations can be used as predictors and calculate the human predictors precision and recall in the two settings by comparing annotations with ground truth labels.

TABLE 2

Positive Precision and Recall in Human Annotation Tasks

| ANNOTATION TASK | PRECISION | RECALL |
| --- | --- | --- |
| WITH EMAIL BODY | 0.93447 | 0.76612 |
| WITHOUT EMAIL BODY | 0.91506 | 0.52862 |

Table 2 shows drops in both positive precision and recall when the human annotators were not provided with the email body. However, the drop in positive precision is not as significant as the drop in positive recall. To make sure that the comparison between these two annotations is fair and not biased toward the annotation behavior, the Krippendorff's a agreement score for inter-annotator agreement among multiple judges was determined. The a score for the annotation task including the full body of the email message was 0.58 and for the task without the email body is 0.56. The a scores are only slightly different which implies the annotation behavior does not vary substantially from one task to the other.

To further understand the impact of context on human predictors, Table 3 shows a confusion matrix for human predictions without context. This provides more information about the type of errors humans make when they lack access to the context. Recall that human predictions for each sentence is the majority of the annotations for each sentence when the annotators do not have access to the email body.

TABLE 3

Confusion Matrix for Human Predictions

| PREDICTIONS | TRUE POSITIVE | FALSE POSITIVE |
| --- | --- | --- |
| WITH EMAIL BODY | 175(%32.4) | 14(%2.6) |
| WITHOUT EMAIL BODY | 95(%17.6) | 256(%47.4) |

Table 3 shows that the true positive sentences benefit significantly from the contextual information in the email body. Overall, this analysis shows that human annotators perform far better in intent detection when they are provided with contextual information, in the form of the full body of the email message. Similarly, machine learning (ML) models for identifying intent can also benefit from the contextual information. Embodiments can incorporate the context information into a linear model (e.g., logistic regression) and deep learning model (e.g., a recurrent neural network (RNN)), such as to improve intent detection in communications.

Given a communication, and a specified subset of content in the communication(s), a goal can be to predict whether the subset of content implies a given intent. It was shown earlier that humans benefit from the context provided by the full email body when identifying intents. As such, embodiments include a model architecture to leverage the context information for intent identification.

Figure 3:
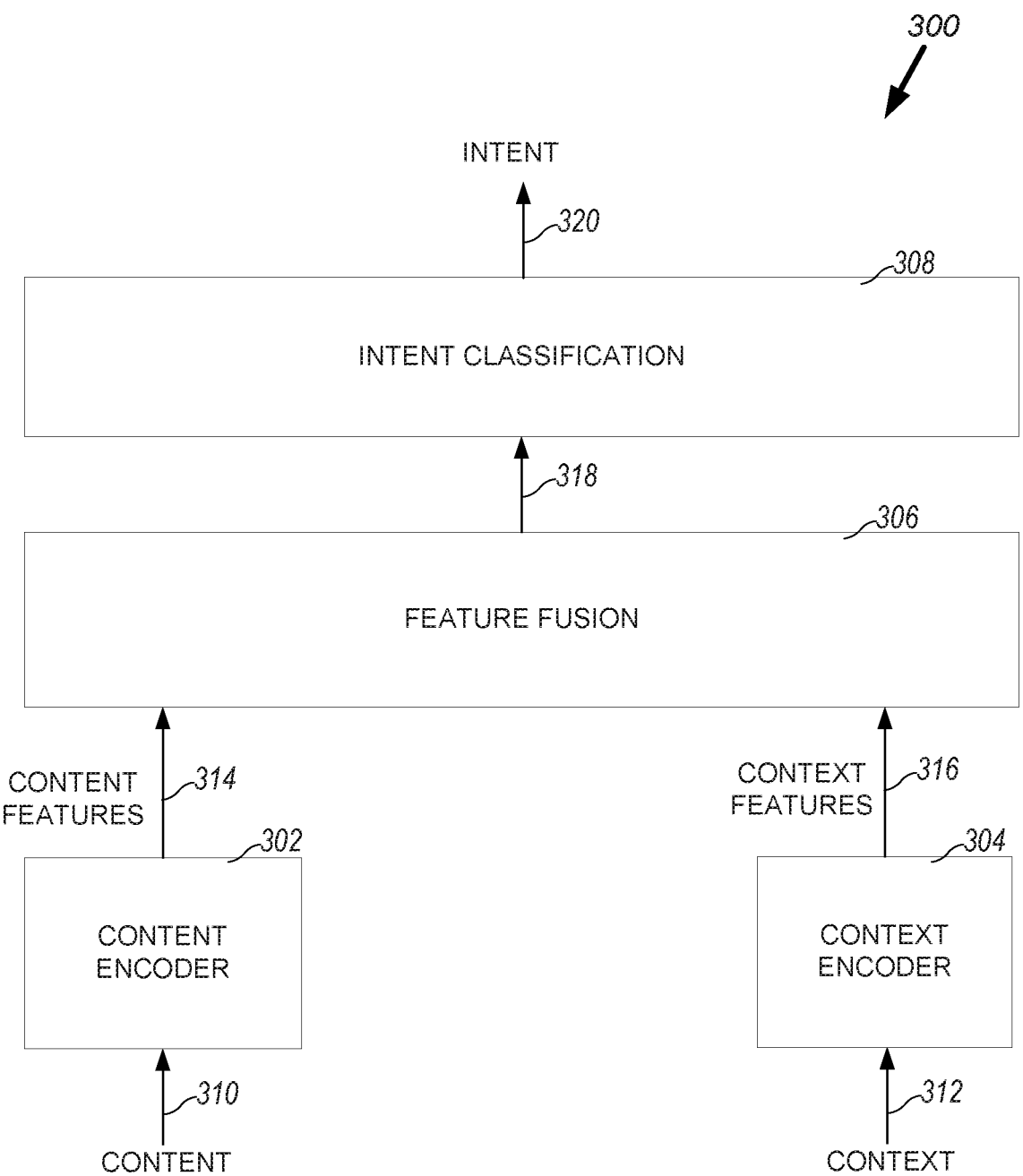
FIG. 3 illustrates, by way of example, a diagram of an embodiment of an intent classification architecture.

FIG. 3 illustrates, by way of example, a diagram of an embodiment of an intent classification architecture 300. The architecture 300 as illustrated includes a content encoder 302, context encoder 304, feature fusion operation 306, and a classification operation 308. Any of the components of the architecture 300 can be implemented using one or more neural network (NN) layers.

The content encoder 302 takes, as input, target content 310. The content encoder 302 extracts content features 314 from the content 310. Similarly, the context encoder 304 extracts context features 316 from context 312. The content 310 can includes one or more characters, words, phrases, sentences, or the like. The content 310 can be from a body portion, title, subject, header, footer, from:, to:, cc:, bcc:, or other portion of a communication. The context 312 can include metadata of the communication, such as can indicate a date, time, author, signature, text from other, related communications, such as another message in a chain of messages, or the like. An encoder, such as the encoder 302, 304 can include a recurrent neural network (RNN) (e.g., a gated-recurrent unit (GRU), such as a bidirectional GRU, or the like), a convolutional NN (CNN), a CNN with attention, a transformer, an autoencoder, or the like.

The content features 314, context features 316 can include the words represented using Bag of Words, global vectors (GloVe) for word representation, Word2Vec, or determined using term frequency (TF), inverse document frequency (IDF), TF-IDF, or the like.

The outputs of the content encoder 302 and context encoder 304 may be used as input to a feature fusion operation 306. The feature fusion operation 306 generates a context-aware content representation 318. The context-aware content representation 318 can be used by an intent classification operation 308 to determine an intent 320 (if any) in the content 310. The feature fusion operation can include an aggregation function. The aggregation function can be performed based on the content features 314 and the context features 316.

The architecture 300 extracts features from the content 310 and the context 312. The architecture may augment the content features 314 and the context features 316 together. The architecture 300 may be used in a traditional machine learning model or a deep learning model. Each is described in turn.

Traditional Machine Learning Model

Previous work has used learning techniques, such as logistic regression and SVMs for detecting intents in email text. This work can be improved by incorporating context, such as by using the architecture 300.

The content encoder 302 may include a manually generated feature extractor. The feature extractor can include n-grams (e.g., up to 3-grams) from the target content 310. The content encoder may use n-gram TF-IDF or other values as features.

The context encoder 304 can similarly include a manually generated feature extractor. Like the content encoder 302, the context encoder 304 may include a feature extractor with n-grams (e.g., up to 3-grams) extracted from the context 312.

The feature fusion operation 306 may augment the content features 314 with context features 316. The feature fusion operation 306 can concatenate the content features 314 and the context features 316. This allows the intent classification operation 308 access to features extracted from the context 312 while maintaining separate feature spaces for the content 310 and the context 312.

The intent classification operation 308 can perform Logistic Regression (LR), SVM, or the like to generate the intent 320. The intent 320 can include one or more of the intents, sub-intents, or "no intent", among other intents.

Deep Learning Model

Figure 4:
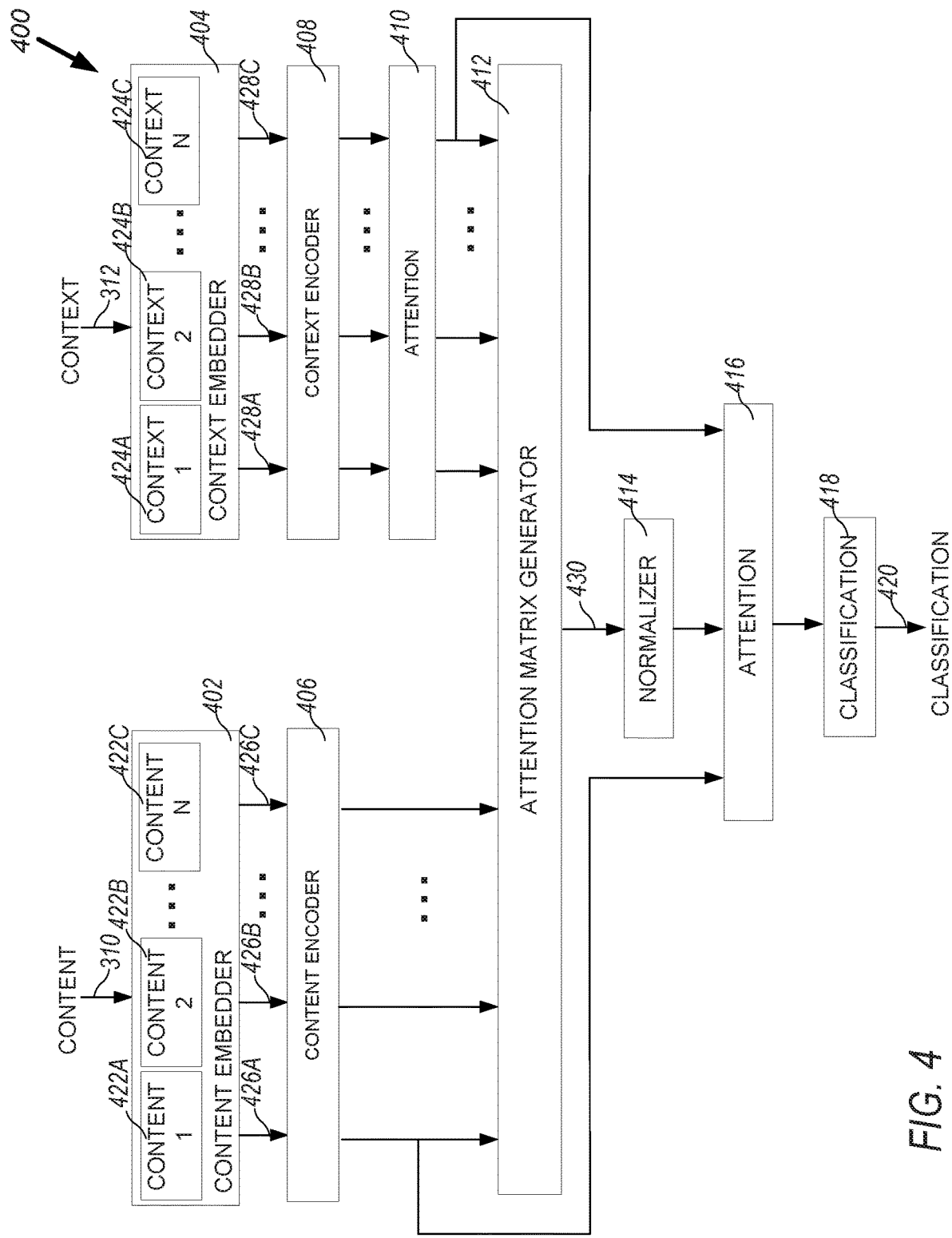
FIG. 4 illustrates, by way of example, a diagram of an embodiment of an architecture for determining an intent in content of a communication.

FIG. 4 illustrates, by way of example, a diagram of an embodiment of an architecture 400 for determining an intent in content of a communication. The architecture 400 is sometimes called a dynamic-context recurrent neural network (DCRNN) model. A content embedder 402 and a content encoder 406 can be implemented as part of the content encoder 302; a context embedder 404, a context encoder 408, and an attention operation 410 can be implemented as part of the context encoder 304; an attention matrix generator 412, a normalizer 414, and an attention operation 416 may be implemented as part of the feature fusion operation 306; and a classification operation 418 may be implemented as part of the intent classification operation 308. The NN architecture 400 may better represent content, context, and interaction between them as compared to the traditional approach.

The architecture 400 as illustrated includes the content embedder 402, the context embedder 404, the content encoder 406, the context encoder 408, the attention operation 410, the attention matrix generator 412, the normalizer 414, another attention operation 416, and the classification operation 418.

The context embedder 404 and the content embedder 402 can project a subset of the context 312 and the content 310, respectively, to a high-dimensional space. The content embedder 402 transforms each word $w_i$ in the content 310 to a space in which semantically related words are closer to each other. The context embedder 404 similarly transforms each word, $w_j$, in the context 312 to the space in which semantically related words are closer to each other. The word embedding can include multiplying by a word embedding matrix $W \in R^{d \times |V|}$. Here $|V|$ is a size of the vocabulary, and d is the dimension of the word embedding. A technique performed by the context embedder 404 and the content embedder 402 can include Word2Vec, embeddings from language models (ELMO), bidirectional encoder representations from transformers (BERT), and global vectors (GloVe) for word representation, or the like. In some embodiments, the embeddings from the high-dimensional vector space can be used to initialize an embedding layer NN of the context embedder 404 or the content embedder 402, which then is then trained, to be adapted to an intent determination task.

Given content 310, s, with a list of words $w_i$, $i \in 1 \ldots L$, the content encoder 406 enriches the representation of each word with knowledge from the content scope. Content portions 422A, 422B, 422C represent words, phrases, a specified number of characters, or the like. The content encoder 406 can break the content 310 into atomic portions 422A-422C and operate on the atomic portions 422A-422C. The discussion herein assumes, without loss of generality, that the atomic portions are at the word level, but other levels are possible.

The content encoder 406 can encode the embedded content 426 from the content embedder 402. The content encoder 406 may include a bi-directional gated recurrent unit (GRU), long short-term memory (LSTM) unit, convolutional neural network (CNN) with attention, an autoencoder, a transformer (a pure attention model without CNN or RNN), a combination thereof, or the like. A bi-directional GRU includes two RNNs, a forward RNN and a backward RNN. The forward RNN reads the embedded content 426 in a forward order and the reverse RNN reads the embedded content 426 in an opposite order. The hidden state identified by content encoder 406 can include a hidden state, $h_i$, for each word, $w_i$, in content, s, by concatenating a forward hidden state, $\vec{h}_i$, and a backward hidden state, $\overleftarrow{h}_i$, such that $h_i = [\vec{h}_i, \overleftarrow{h}_i]$. Scanning the text from both directions allows the representation of each word to carry information from the words before and after the target word of the content 310.

Given context 312, c, with one or more sentences $s_j$, $j \in 1 \ldots N$, the context encoder 408 enriches the representation of each embedded sentence 428 with knowledge from the context. Context portions 424A, 424B, 424C represent words, phrases, sentences, a specified number of characters, or the like. The context encoder 408 can break the content 310 into atomic portions 424A-424C and operate on the atomic portions 424A-424C. The discussion herein assumes, without loss of generality, that the atomic portions are at the sentence level, but other levels are possible.

The context encoder 408 may perform same operations as the content encoder 406 with the context encoder 408 operating on the embedded context 428A-428C. Given the hidden states of the embedded context 428A-428C, the context encoder 408 can represent the sentence. There are several techniques that the context encoder 408 can use to build the sentence representation, such as max-pooling and averaging over the hidden state matrix. One disadvantage of these methods is that they treat all words of the context 312 equally. However, in identifying an intent, some keywords in the context 312 tend to be more important than others. For example, "meet", "discuss", and "get together" are strong signals for the schedule meeting intent. As such, an encoding technique that applies variable weights to the context 312 can help identify the stronger signals. Such an encoder can perform an attention operation 410. The attention operation determined a weighted average of the hidden states identified by the context encoder 408 as the context representation. More important words are expected to have larger attention weights. The more important words can be learned from the data during model training.

To compute the attention weights applied by the attention operation 410, consider a context status vector, $u_s$, where the dimension of $u_s$ is a hyperparameter (that can set arbitrarily). The attention operation 410 takes all the hidden states, H, of the context as input. The attention operation 410 computes the weight vector, $\alpha$, as:

$$\alpha = \text{Softmax}(u_s \text{ Tan } h(W_s H^T + b_s)) \quad \text{Equation 1}$$

Note that $H = [h_1, h_2, \ldots, h_L]$, and $W_s$ and $b_s$ are the weight matrix and bias vector of a one-layer multi-layer perceptron (MLP) NN. A one-layer MLP includes one hidden layer. One or more nodes in the MLP use a nonlinear activation function. A one-layer MLP is sometimes called a vanilla NN. Common activation functions for the MLP nodes include a hyperbolic tangent function, a logistic function, a rectifier function, and a softplus function. The context representation, $r_s$, provided by the attention operation 410 may be determined as $$r_s = \alpha H \qquad \text{(Equation 2)}.$$

The attention operation 410 in the context of this disclosure identifies which portions of the context 312 are most likely to correspond to a potential intent in the content 310. By factoring attention into a NN (focusing on characters that indicate or clarify an intent), the NN that determines the intent may be improved.

Feature fusion can operate on the hidden states, $H_s$, of the target content, s, and the context representations, Rc, of the context, c to generate a representation of the context 312 in consideration of the content 310. Each portion of content 422 can be augmented with relevant information from the context 312. To perform the computation an unnormalized attention matrix $A=F(H_s, R_c) \in R^{L \times N}$ can be determined by the attention matrix generator 412. Here L is the length of the target content 310, s, and N is the number of sentences in the context, c. Each element in $A_{ij}$ is a scalar that represents the relation between the token i in the target sentence and the sentence j in the context. Each element $A_{ij}$ can be computed as:

$$A_{ij} = w_c^T [H_s^i; R_c^j; H_s^i \circ R_c^j] \in R$$

where $w_c$ is a trainable weight vector, [;] is vector concatenation and ○ is element-wise multiplication. This results in a matrix A in which each entry represents how relevant each portion 424A-424C in the context 312 is to the portion 422A-422C of the content 310.

A normalizer 414 can adjust the values of A (e.g., such that entries across each row or each column add up to 1). The result of the normalizer 414 is a vector $a_l$ for each portion 422A-422C of the content 310. The context-aware representation for the $l^{th}$ portion 422A-422C may be represented as:

$$H_s^l = [H_s^l, (R_c)^T a_l]$$

Another attention operation 416, similar to Equations 1 and 2, can be applied to on $H_s$ to get the final context-aware representation $v_s$ for the content portion 422A-422C.

The classification operation 418, given the target sentence representation $v_s$, performs a prediction of whether the content portion 422A-422C includes an intent and which intent it includes. The classification operation 418 can be performed by a Softmax operation. The Softmax operation determines a normalized probability distribution of $v_s$. The classification operation 418 can produce a classification 420 that includes labels (intents or sub-intents) and respective confidence scores. The confidence scores of the classification 420 can be element-wise compared to a threshold to determine whether the corresponding label is present in the content portion 422A-422C. The prediction, p, can be determined, at least in part, by:

$$p = \text{Softmax}(W_p v_s + b_p)$$

where p is the prediction probability, and $W_p$, and $b_p$ are the parameters of the final full connection layer. A cross-entropy, or other loss function can be used to train the model.

Two types of ML programs include supervised learning and unsupervised learning. Embodiments discussed herein, such as the architectures 300, 400 are supervised ML programs. Supervised ML includes providing a model with example inputs and corresponding desired outputs. Weights of the model are updated such that the desired output is generated by the model when provided with the corresponding input. The model can then be provided with an input it has not operated on previously to predict to which output the input corresponds. In unsupervised learning, the input and output examples are not provided to the model, and the model is left to find structure in the input on its own. Unsupervised learning can be used to identify features of the inputs that can be used to uniquely identify the inputs. Embodiments herein can apply supervised learning to a problem of task extraction from communications.

In some embodiments, the machine learning program the model executor 554 can include an NN trained by the ML trainer 552. NNs are computational structures that are loosely modeled on biological neurons. Generally, NNs encode information (e.g., data or decision making) via weighted connections (e.g., synapses) between nodes (e.g., neurons). Modern NNs are foundational to many machine learning applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc. For machine learning of the intent, a supervised technique can be employed.

Figure 5:
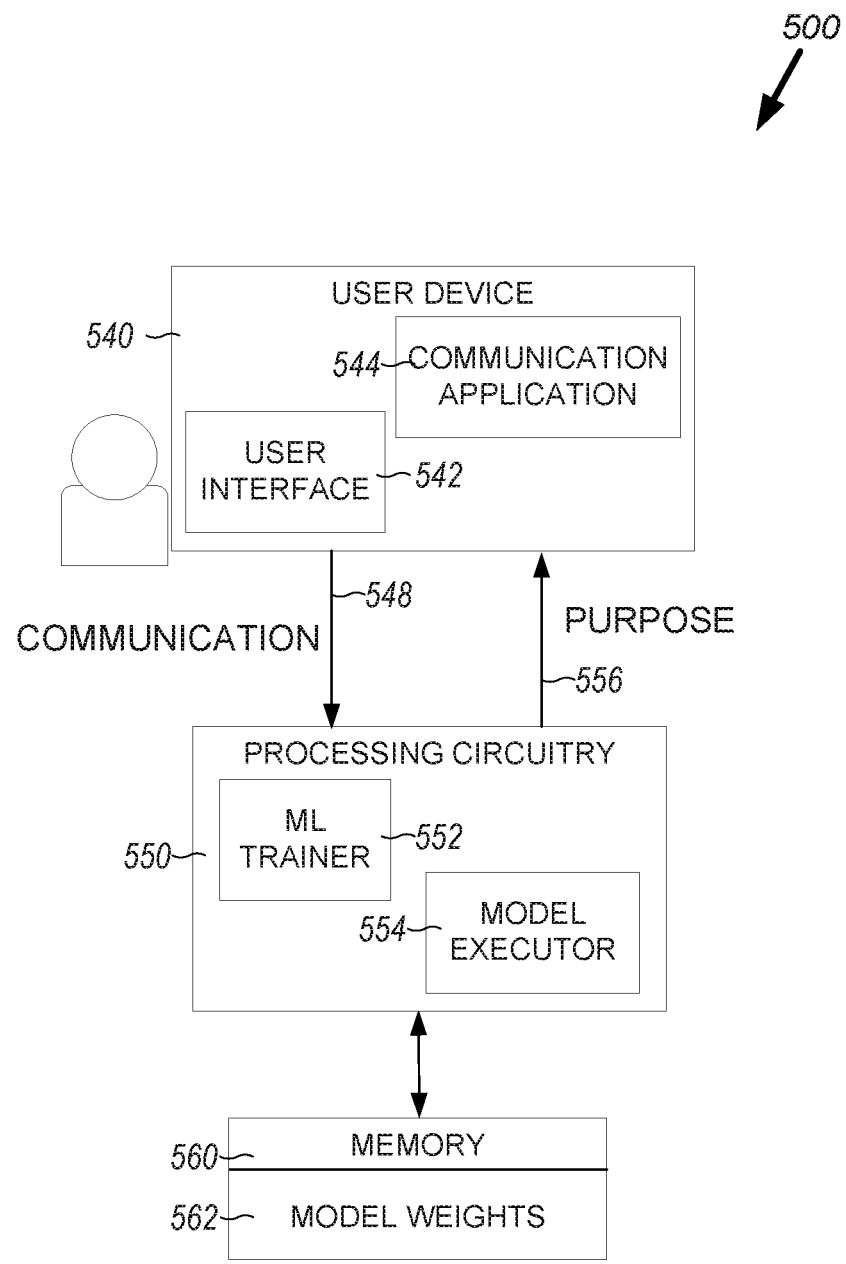
FIG. 5 illustrates, by way of example, a diagram of an embodiment of a system for purpose detection.

FIG. 5 illustrates, by way of example, a diagram of an embodiment of a system 500 for purpose detection. The system 500 as illustrated includes a user device 540, processing circuitry 550, and a memory 560. The user device 540 provides the user with functionality of a communication application 544 through a user interface 542. The user device 540 may include a smartphone, laptop computer, desktop computer, tablet, phablet, e-reader, or the like that is capable of providing the functionality of the communication application 544.

The user interface 542 receives signals from an input device controlled by the user. The user interface 542 interprets the signals and causes the communication application 544 to issue or receive a communication based on the signals.

The communication application 544 is an application through which the user generates, edits, or reviews a communication, such as the email 100, a message from a messaging service, a voicemail, a phone call (e.g., a transcript of a phone call, audio of the phone call, or the like), or the like. A communication 548 to or generated by the user of the communication application 544 may be recorded.

The communication 548 to or generated by the communication application 544, may be provided to the processing circuitry 550. The processing circuitry 550 includes hardware, software, or firmware configured to determine a relationship between a comment and an edit. Hardware may include one or more electric or electronic components configured to perform one or more operations of the processing circuitry 550. The electric or electronic components may include one or more transistors, resistors, capacitors, diodes, inductors, analog to digital converters, digital to analog converters, rectifiers, power supplies, logic gates (e.g., AND, OR, XOR, negate, buffer, or the like), switches, oscillators, modulators, demodulators, relays, antennas, phase-looked-loops, amplifiers, central processing units (CPUs), graphics processing units (GPUs), application specific integrated circuits (ASICs), field programmable gate arrays (FPGAs), or the like.

The processing circuitry 550 as illustrated includes an ML trainer 552 and a model executor 554. The ML trainer 552 operates to determine weights 562 of an ML model to be executed by the model executor 554. The ML trainer 552 may operate in a supervised manner, such as by predicting an output for a given input and comparing the predicted output to a known output. A loss function may indicate how to change the weights of the ML model to make a better prediction on future data. The ML trainer 552 may be configured to perform operations of the method(s) provided by architecture 300, 400.

The processing circuitry 550, while illustrated as being separate from the user device 540, may be a part of the user device 540 in some embodiments. In some other embodiments, the processing circuitry 550 may be part of a different computing device or devices. In some embodiments the processing circuitry 550 is part of the cloud or is provided as a service through the Internet or other network. While the processing circuitry 550 illustrates the ML trainer 552 and the model executor 554 as part of the same device, they may be on different devices. For example, the ML trainer 552 may be implemented in the cloud, while the model executor 554 may be implemented on the user device 540.

The weights 562 may be provided to the memory 560 for future access by the model executor 554. The model executor 554 may retrieve the weights 562 and implement the model using the weights 562. The model may generate a purpose 556 associated with the communication 548. The purpose 556 can include a sub-purpose in one or more embodiments. Example purposes include information exchange, task management, scheduling and planning, social communication, and other. Example sub-purposes include requesting information, sharing information, promising action, requesting action, sending a reminder, scheduling a meeting or appointment, among others.

Figure 6:
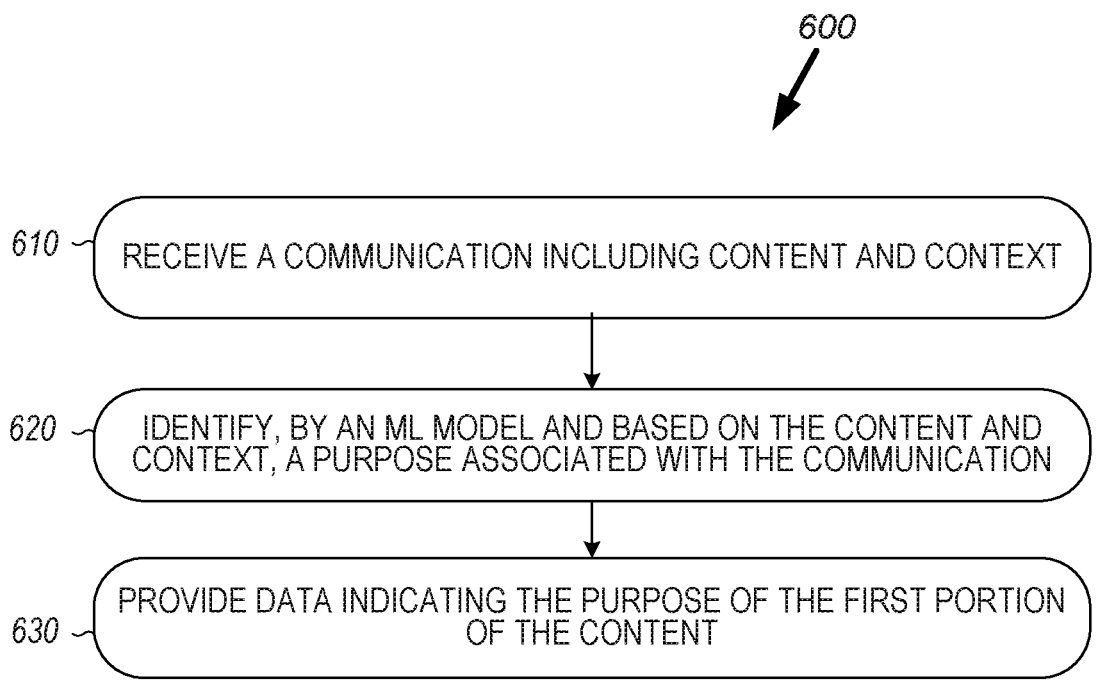
FIG. 6 illustrates, by way of example, a diagram of an embodiment of a method for intent detection

FIG. 6 illustrates, by way of example, a diagram of an embodiment of a method 600 for purpose detection. The method 600 as illustrated includes receiving a communication including communication content and communication context, at operation 610; identifying, by an ML model and based on the communication content and the communication context, one or more purposes associated with the communication, at operation 620; and providing data indicating the purpose of the first portion of the content, at operation 630. The one or more purposes can indicate respective actions to be performed by a user that generated or received the communication. The communication content can include a first portion of the communication and the communication context a second, different portion of the communication or a portion of another communication.

The method 600 can further include, wherein the communication is an email, the first portion is a sentence from the email, and the communication context is content, other than the sentence, from the same email or a different email. The method 600 can further include, wherein the ML model includes a dynamic-context recurrent neural network (RNN) that implements a content encoder to encode the first portion into encoded content, a context encoder to encode the context into encoded context, a feature fusion operation to combine the encoded content and encoded context into a fused representation, and a classification operation that determines the purpose of the content based on the fused representation.

The method 600 can further include, wherein the content encoder encodes sentences of the context and performs a purpose-based attention operation on the encoded sentences to generate weighted and encoded sentences. The method 600 can further include, wherein the feature fusion operation receives the weighted and encoded sentences and generates an attention matrix that includes values indicating for the portion of the content, which portions of the communication context are more relevant. The method 600 can further include, wherein the ML model further performs another attention operation that operates based on the generated attention matrix to generate a context-aware representation of the communication content, and wherein the classification operation operates on the context-aware representation.

The method 600 can further include, wherein the purpose of the communication includes one or more purposes and one or more corresponding sub-purposes. The method 600 can further include, wherein the purpose of the communication relates to information exchange, task management, scheduling and planning, and social communication, and wherein a sub-purpose for information exchange relates to sharing information or requesting information, a sub-purpose for task management includes requesting an action or promising an action, a sub-purpose for scheduling and planning include scheduling a meeting or reminding of a meeting, and a sub-purpose for social communication includes a greeting or thank you. The method 600 can further include, wherein the processing circuitry is further to provide data indicating the purpose to a personal information manager (PIM) application that cause the PIM to automatically generate a reminder or a meeting invite.

Figure 7:
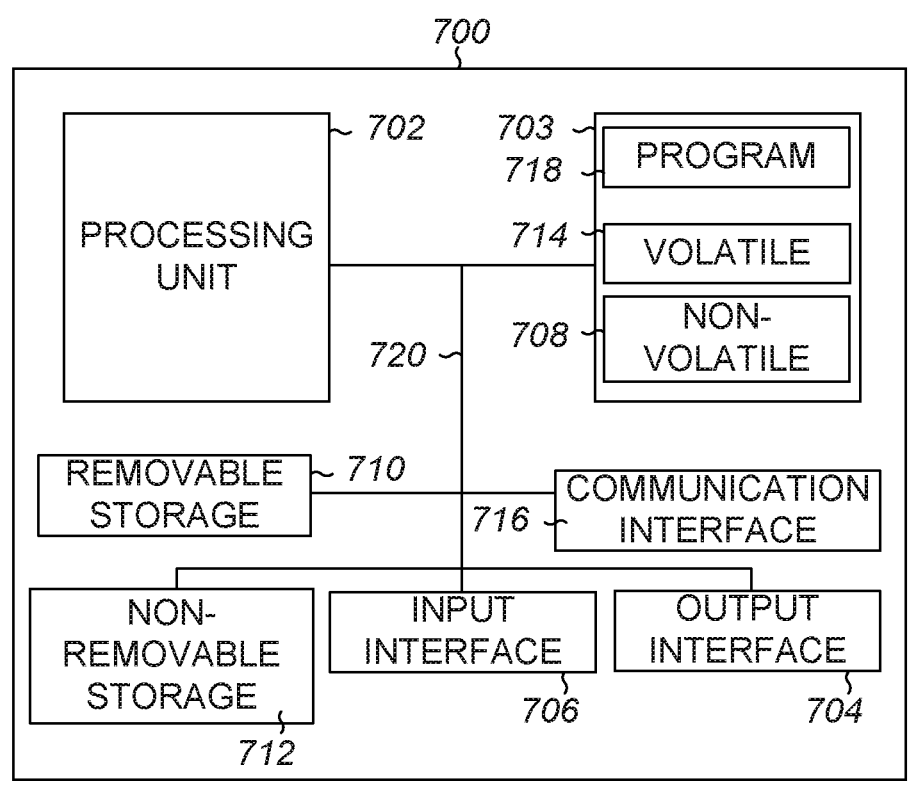
FIG. 7 illustrates, by way of example, a block diagram of an embodiment of a machine (e.g., a computer system) to implement one or more embodiments.

FIG. 7 illustrates, by way of example, a block diagram of an embodiment of a machine 700 (e.g., a computer system) to implement one or more embodiments. One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the machine 700, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

Additional Notes and Examples

Example 1 includes a system comprising a memory to store parameters defining a machine learning (ML) model, the ML model to identify whether one or more purposes are associated with a communication, the one or more purposes indicating respective actions to be performed by a user that generated or received the communication, and processing circuitry to provide, as input to the ML model, data indicating communication content and communication context, the communication content including a first portion of content from the communication to be classified, and the communication context including (a) content from an associated, different communication or (b) content from a second, different portion of the communication to be classified, and receive, as output of the ML model, data indicating the purpose of the first portion of the content.

In Example 2, Example 1 further includes, wherein the communication is an electronic mail (email), the first portion is a sentence from the email, and the context is content, other than the sentence, from the same email or a different email.

In Example 3, at least one of Examples 1-2 further includes, wherein the ML model includes a dynamic-context recurrent neural network (RNN) that implements a content encoder to encode the first portion into encoded content, a context encoder to encode the context into encoded context, a feature fusion operation to combine the encoded content and encoded context into a fused representation, and a classification operation that determines the purpose of the content based on the fused representation.

In Example 4, Example 3 further includes, wherein the content encoder encodes sentences of the context and performs a purpose-based attention operation on the encoded sentences to generate weighted and encoded sentences.

In Example 5, Example 4 further includes, wherein the feature fusion operation receives the weighted, encoded sentences and generates an attention matrix that includes values indicating, for respective portions of the content, which portions of the context are relevant.

In Example 6, Example 5 further includes, wherein the ML model further performs another attention operation that operates based on the generated attention matrix to generate a context-aware representation of the content, and wherein the classification operation operates on the context-aware representation.

In Example 7, at least one of Examples 1-6 further includes, wherein the purpose of the communication includes one or more purposes and one or more corresponding sub-purposes.

In Example 8, Example 7 further includes, wherein the purpose of the communication relates to information exchange, task management, scheduling and planning, and social communication, and wherein a sub-purpose for information exchange relates to sharing information or requesting information, a sub-purpose for task management includes requesting an action or promising an action, a sub-purpose for scheduling and planning include scheduling a meeting or reminding of a meeting, and a sub-purpose for social communication includes a greeting or thank you.

In Example 9, at least one of Examples 1-8 further includes, wherein the processing circuitry is further to provide data indicating the purpose to a personal information manager (PIM) application that cause the PIM to automatically generate a reminder or a meeting invite.

Example 10 includes a method for determining a purpose of a communication, the method comprising receiving a communication including communication content and communication context, the communication content a first portion of the communication and the communication context a second, different portion of the communication, identifying, by a machine learning (ML) model, based on the communication content and the communication context, one or more purposes associated with the communication, the one or more purposes indicating respective actions to be performed by a user that generated or received the communication, and providing data indicating the purpose of the first portion of the content.

In Example 11, Example 10 further includes, wherein the communication is an electronic mail (email), the first portion is a sentence from the email, and the communication context is content, other than the sentence, from the same email or a different email.

In Example 12, at least one of Examples 10-11 further includes, wherein the ML model includes a dynamic-context recurrent neural network (RNN) that implements a content encoder to encode the first portion into encoded content, a context encoder to encode the context into encoded context, a feature fusion operation to combine the encoded content and encoded context into a fused representation, and a classification operation that determines the purpose of the content based on the fused representation.

In Example 13, Example 12 further includes, wherein the content encoder encodes sentences of the context and performs a purpose-based attention operation on the encoded sentences to generate weighted and encoded sentences.

In Example 14, Example 13 further includes, wherein the feature fusion operation receives the weighted and encoded sentences and generates an attention matrix that includes values indicating for the portion of the content, which portions of the communication context are more relevant.

In Example 15, Example 14 further includes, wherein the ML model further performs another attention operation that operates based on the generated attention matrix to generate a context-aware representation of the communication content, and wherein the classification operation operates on the context-aware representation.

Example 16 includes a non-transitory machine-readable medium including instructions that, when executed by a machine, cause the machine to perform operations comprising receiving a communication including communication content and communication context, the communication content including a first portion of the communication and the communication context including a second, different portion of the communication, identifying, by a machine learning (ML) model, based on the communication content and the communication context, one or more purposes associated with the communication, the one or more purposes indicating respective actions to be performed by a user that generated or received the communication, and providing data indicating the purpose of the first portion of the content.

In Example 17, Example 16 further includes, wherein the purpose of the communication includes one or more purposes and one or more corresponding sub-purposes.

In Example 18, Example 17 further includes, wherein the purpose includes information exchange, task management, scheduling and planning, and social communication, and wherein a sub-purpose for information exchange includes sharing information or requesting information, a sub-purpose for task management includes requesting an action or promising an action, a sub-purpose for scheduling and planning include scheduling a meeting or reminding of a meeting, and a sub-purpose for social communication includes a greeting or thank you.

In Example 19, at least one of Examples 16-18 further includes, wherein the ML model includes a dynamic-context recurrent neural network (RNN) that implements a content encoder to encode the first portion into encoded content, a context encoder to encode the context into encoded context, a feature fusion operation to combine the encoded content and encoded context into a fused representation, and a classification operation that determines the purpose of the content based on the fused representation.

In Example 20, Example 19 further includes, wherein the content encoder encodes sentences of the context and performs a purpose-based attention operation on the encoded sentences to generate weighted and encoded sentences, the feature fusion operation receives the weighted and encoded sentences and generates an attention matrix that includes values indicating for the portion of the content, which portions of the context are more relevant, the ML model further performs another attention operation that operates based on the generated attention matrix to generate a context-aware representation of the content, and the classification operation operates on the context-aware representation.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
a memory to store parameters defining a machine learning (ML) model configured to identify whether a purpose is associated with a first portion of a communication; and
processing circuitry to:
implement the ML model;
provide the first portion of the communication and communication context of the communication to the ML model, the communication context including (a) content from an associated, different communication or (b) content from a second, different portion of the communication;
evaluate the ML model to produce the purpose of the first portion of the communication, and
provide the purpose of the first portion of the communication,
wherein the ML model implements a purpose-based attention operation on encoded sentences and generates weighted and encoded sentences, and implements a feature fusion operation that receives the weighted, encoded sentences and generates an attention matrix that includes values indicating, for respective portions of the content, which portions of the context are relevant.

2. The system of claim 1, wherein the purpose indicates a respective action to be performed by a user that generated or received the communication.

3. The system of claim 1, wherein the ML model is configured to:
   identify which portions of the context correspond to the purpose of the content,
   augment the content with relevant data from the context, and
   determine, based on the augmented content, the purpose of the first portion of the content.

4. The system of claim 1, wherein the communication is an electronic mail (email), the first portion is a sentence from the email, and the context is content, other than the sentence, from the same email or a different email.

5. The system of claim 1, wherein the ML model further implements another attention operation that operates based on the generated attention matrix to generate a context-aware representation of the content, and wherein the classification operation operates on the context-aware representation.

6. The system of claim 1, wherein the purpose of the communication includes one or more purposes and one or more corresponding sub-purposes.

7. The system of claim 6, wherein the purpose of the communication relates to information exchange, task management, scheduling and planning, and social communication, and wherein a sub-purpose for information exchange relates to sharing information or requesting information, a sub-purpose for task management includes requesting an action or promising an action, a sub-purpose for scheduling and planning include scheduling a meeting or reminding of a meeting, and a sub-purpose for social communication includes a greeting or thank you.

8. The system of claim 1, wherein the processing circuitry is further to provide data indicating the purpose to a personal information manager (PIM) application that cause the PIM to automatically generate a reminder or a meeting invite.

9. The A method for determining a purpose of a communication, the method comprising:
   receiving an ML model configured to determine a purpose of a first portion of a communication;
   providing the first portion of the communication and communication context of the communication to the ML model, the communication context including (a) content from an associated, different communication or (b) content from a second, different portion of the communication;
   evaluating the ML model to produce the purpose of the first portion of the communication, and
   providing the purpose of the first portion of the communication,
   wherein the ML model implements a purpose-based attention operation on encoded sentences and generates weighted and encoded sentences, and implements a feature fusion operation that receives the weighted, encoded sentences and generates an attention matrix that includes values indicating, for respective portions of the content, which portions of the context are relevant.

10. The method of claim 9, wherein the ML model is configured to:
   identify which portions of the context correspond to the purpose of the content,
   augment the content with identified portions from the context, and
   determine, based on the augmented content, the purpose of the first portion of the content.

11. The method of claim 9, wherein the purpose indicates a respective action to be performed by a user that generated or received the communication.

12. The method of claim 9, wherein the communication is an electronic mail (email), the first portion is a sentence from the email, and the communication context is content, other than the sentence, from the same email or a different email.

13. The method of claim 9, wherein the purpose of the communication includes one or more purposes and one or more corresponding sub-purposes.

14. The method of claim 13, wherein the purpose of the communication relates to information exchange, task management, scheduling and planning, and social communication, and wherein a sub-purpose for information exchange relates to sharing information or requesting information, a sub-purpose for task management includes requesting an action or promising an action, a sub-purpose for scheduling and planning include scheduling a meeting or reminding of a meeting, and a sub-purpose for social communication includes a greeting or thank you.

15. The A non-transitory machine-readable medium including instructions that, when executed by a machine, cause the machine to perform operations comprising:
   receiving an ML model configured to determine a purpose of a first portion of a communication;
   providing the first portion of the communication and communication context of the communication to the ML model, the communication context including (a) content from an associated, different communication or (b) content from a second, different portion of the communication;
   evaluating the ML model to produce the purpose of the first portion of the communication, and
   providing the purpose of the first portion of the communication,
   wherein the ML model implements a purpose-based attention operation on encoded sentences and generates weighted and encoded sentences, and implements a feature fusion operation that receives the weighted, encoded sentences and generates an attention matrix that includes values indicating, for respective portions of the content, which portions of the context are relevant.

16. The non-transitory machine-readable medium of claim 15, wherein the purpose of the communication includes one or more purposes and one or more corresponding sub-purposes.

17. The non-transitory machine-readable medium of claim 16, wherein the purpose includes information exchange, task management, scheduling and planning, and social communication, and wherein a sub-purpose for information exchange includes sharing information or requesting information, a sub-purpose for task management includes requesting an action or promising an action, a sub-purpose for scheduling and planning include scheduling a meeting or reminding of a meeting, and a sub-purpose for social communication includes a greeting or thank you.

18. The non-transitory machine-readable medium of claim 17, wherein the purpose indicates a respective action to be performed by a user that generated or received the communication.

19. The non-transitory machine-readable medium of claim 15, wherein the ML model is configured to:

identify which portions of the context correspond to the purpose of the content,
augment the content with relevant data from the context, and
determine, based on the augmented content, the purpose of the first portion of the content.

\* \* \* \* \*